March 20, 1945.    O. SANDBERG    2,372,020
WRAPPING PAPER CUTTING MECHANISM
Original Filed Feb. 17, 1942
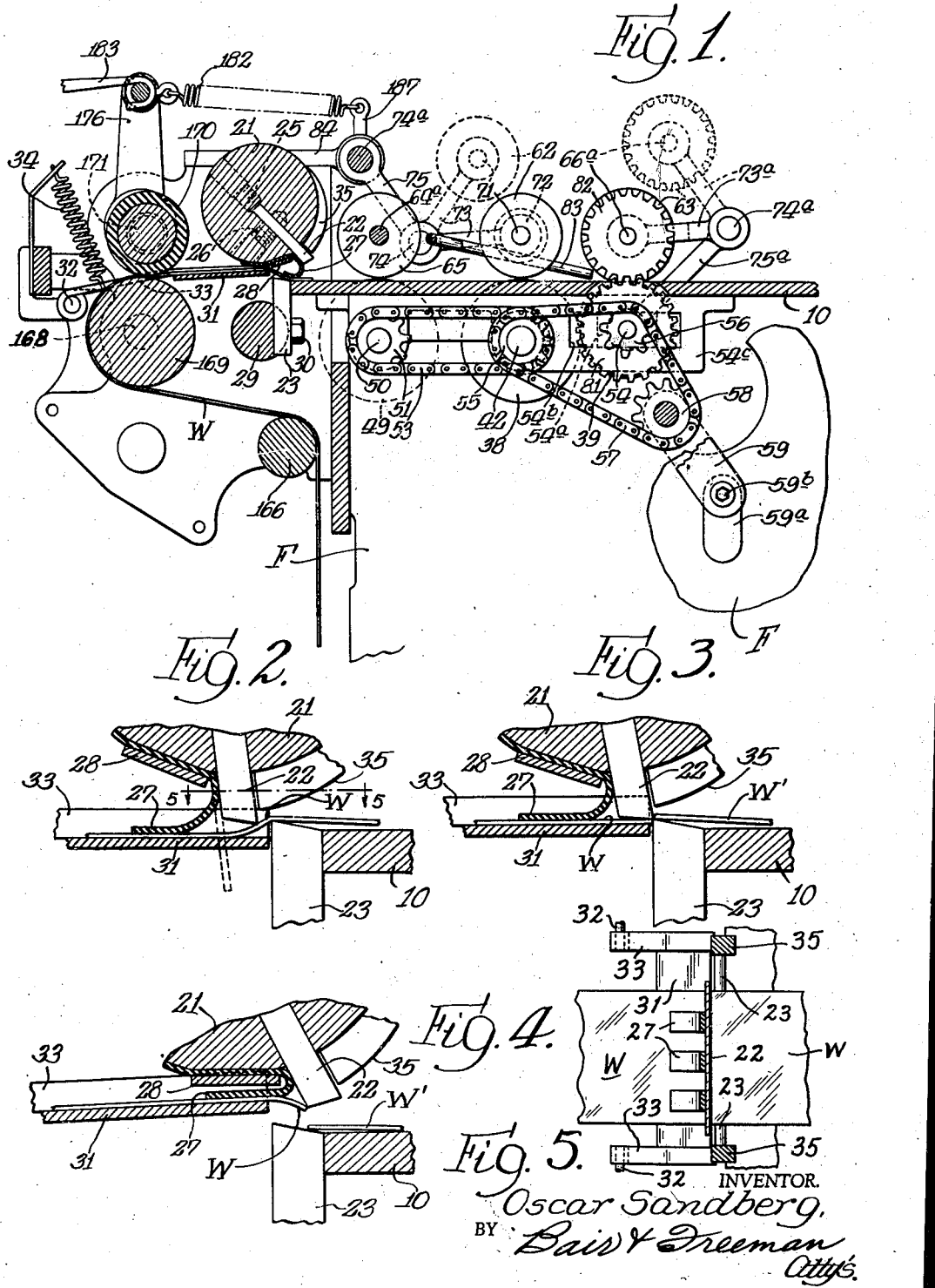
INVENTOR.
Oscar Sandberg.
BY Bair & Freeman
Attys.

Patented Mar. 20, 1945

2,372,020

UNITED STATES PATENT OFFICE 2,372,020

WRAPPING PAPER CUTTING MECHANISM

Oscar Sandberg, Defiance, Ohio, assignor to Lynch Manufacturing Corporation, Defiance, Ohio, a corporation of Ohio Original application February 17, 1942, Serial No. 431,209, now Patent No. 2,338,132, dated January 4, 1944. Divided and this application October 11, 1943, Serial No. 505,719

3 Claims. (Cl. 164—68)

My present invention has to do with mechanism for cutting wrappers for a wrapping machine such as shown in my Patents Nos. 2,208,776 and 2,283,097, and in my copending application Serial No. 431,209 filed February 17, 1942, the present application being a division of said application, now Patent No. 2,338,132 issued Jan. 4, 1944.

One object of the invention is to provide means for cutting wrappers from a web of wrapping material so that the wrappers thus cut may be fed onto supporting bars which direct them to a position where the wrappers are wrapped around articles such as candy bars and the like.

Another object is to provide means for cutting the web of wrapping material into sheets or "wrappers" somewhat longer than the candy bars, one form of cutting mechanism being shown in my Patent No. 2,283,097, my parent application, as well as the present one disclosing a modification thereof wherein the wrappers are sheared from the web of material by a rotary shearing blade coacting with a stationary blade, means being provided to assure proper feed of the web to the cutting means for cutting of another wrapper therefrom after the first wrapper has been cut.

Still another object is to provide a floating plate associated with the stationary cutter blade for the purpose of lifting the cut end of the web of wrapping material to a position for clearing the stationary cutting blade so that the web of material is properly fed for the next wrapper, there being a resilient strip carried by the movable or rotary cutter blade for insuring that the cut end of the web of material is retained against the stationary blade in the proper manner.

With these and other objects in view, my invention consists in the construction, arrangement and combination of the various parts of my device whereby the objects contemplated are attained, as hereinafter more fully set forth, pointed out in my claims and illustrated in the accompanying drawing, wherein:

Figure 1 is a sectional view as shown in Figure 3 of my parent application, and showing the feeding means thereof as well as the cutting means of the present application and its relation thereto;

Figures 2, 3, and 4 are enlarged sectional views similar to a portion of Figure 1, showing the cutting means in different positions of operation; and Figure 5 is a reduced sectional view on the line 5—5 of Figure 2.

The wrapping machines of my prior patents are adapted for wrapping articles such as candy bars and the like. The mechanism of this application is adapted to cut a web of wrapping material into individual wrappers to be fed to wrapping position, the parts being synchronized in operation by mechanical interconnections.

The mechanism includes a frame F supporting the various shafts, rollers, etc., of my mechanism.

Wrappers for the articles wrapped in the wrapping machine are supplied in the form of a web W of the proper width and continuous length. The web W passes over an idler roller 166 and then around a feed roller 169. Above the roller 169 a drive roller 170 is provided, at least the roller 170 being of rubber or the like to provide a good grip on the web W and to propel it toward supporting bars 10 when the roller 170 is rotated counter-clockwise (in Figure 1). The roller 170 is mounted on a shaft 171 which is suitably rotated, the shaft 169, in turn, being rotated by speed changing mechanism fully described in my Patent No. 2,283,097.

For maintaining proper pressure between the rollers 168 and 170 the shaft 171 of the roller 170 is carried at its ends by eccentric levers 176, as shown in my Patent No. 2,283,097. The eccentric levers 176 are pivoted at their centers and are urged in the proper direction for moving the roller 170 toward the roller 168, as by springs 182, such movement being limited by a stationary limiting hook 183. The springs 182 at their free ends are connected with stationary arms 187.

Journalled on the frame F is an arbor 21. A movable cutter blade 22 is carried by the arbor 21 and is adapted to shearingly coact with a stationary cutter blade 23 for severing the web W into individual wrappers. The blade 22 is set into the arbor 21 as shown in Figure 1, with set screws 25 to adjust it radially. Other set screws 26 are provided to retain the adjustment.

Trailing the blade 22 is a strip 27 of resilient material, such as rubber or the like, which serves an important function in the web feeding operation, as will hereinafter appear. The strip 27 is held in position by a strap 28 and normally assumes the dotted position shown in Figure 2. The stationary blade 23 is secured to a rigid cross rod 29 by cap screws 30. A floating feed plate 31 is carried by a pair of arms 33 pivoted at 32 and normally raised to a position with the arms 33 engaging the arbor 21. The means for biasing the feed plate 31 to raised position consists of a spring 34 for each arm 33. The arbor 21 carries cams 35 to coact with the arms 33 to lower the floating plate 31 just before a wrapper is cut from the web of wrapping material, as will hereinafter be described.

For propelling the wrappers, indicated at W' in Figures 3 and 4 after they have been severed from the web W, I provide supporting rollers 38, 39 and 49. The roller is mounted on a shaft 54 rotatable in a bearing 54ª. The roller 38 is supported on a drive shaft 42.

The supporting roller 49 is mounted on a shaft 50. The shaft 50 is driven by sprockets 51 and 52 and a chain 53 from the drive shaft 42. The shaft 54 is driven from the drive shaft 42 by sprockets 55 and 56 and a chain 57. The chain 57 also extends around an idler sprocket 58 supported on an arm 59, the arm being secured to a boss 59ª by a cap screw 59ᵇ.

Companion rollers 62, 63, and 65 are provided for the supporting rollers 38, 39 and 49 respectively. The companion rollers are mounted directly above their respective supporting rollers and are arranged to engage the top of the wrapper W' by gravity. For this purpose the roller 65 is mounted on a shaft 64ª journalled in bearings which float in vertical slots of bearing brackets as shown in my parent application wherein additional supporting rollers and other parts are shown. The roller 65 is free to be rotated by the wrapper W' as it passes under the roller.

A shaft 71 carries the roller 62 and rotates in bearings 72 which are formed on a bifurcated arm 73 oscillatable on a stub shaft 74. The stub shaft 74 is fixed in an arm 75 which, in turn, is fixed to a shaft 74' whereby the companion roller 62 may be swung upwardly, as shown by dotted lines in Figure 1, either manually or by the wrinkling of a wrapper between the supporting rollers and the companion rollers. The shaft 74' is fixed in a bracket 84.

Like the companion roller 62, the companion roller 63 is carried by a bifurcated arm 73ª pivoted on a shaft 74ª. The arm 73ª carries a shaft 66ª for the roller 63. The shaft 74ª is supported by a bracket 75ª. The bracket 75ª is carried by the bearing 54ª which is adjustable in a slot 54ᵇ of the bracket 54ᶜ.

It is desirable to stop rotation of the companion rollers 63 when they are elevated, either manually or by the wrinkling of the wrapper. This is done by driving them through gears 81 and 82. The gear 81 is carried by the shaft 54, while the gear 82 is carried by the shaft 66ª. Accordingly, when the shaft 66ª raises it also raises the gear 82 out of mesh with the gear 81.

*Practical operation*

In the operation of my wrapper cutting meanism the web W is fed to cutting position between the rotating rollers 169 and 170. As the arbor 21 rotates, the cams 35 will first engage the arms 33 to depress the feed plate 31 and then the blade 22 will engage the web, as shown in Figure 2, as the rotating cutter blade 22 approaches the stationary cutter blade 23, bending the web between the cutting edges of the blades. When the blade 22 reaches the blade 23 it will shear the web in two, as illustrated in Figure 3 so cutting the wrapper W' as to pull it on into the machine, sliding it along the tops of the bars 10 to wrapping position.

The floating feed plate 31 will thereupon lift the on-coming web W, as in Figure 4, to clear the forward edge of the cut web with respect to the stationary blade 23 and permit the web to be fed to position for cutting another wrapper therefrom. The flexible strip 27 closely following the moving blade 22, will keep the cut edge of the web from curling up, and, instead, it will press it toward the feed plate 31 and the stationblade 23, as shown in this figure.

Any time that the wrapper gets wrinkled instead of feeding properly to wrapping position, the companion rollers will be lifted by the wrapper and indicate to the operator that the mechanism is functioning improperly. The operator may readily lift the companion rollers out of the way to remove the wrinkled portion of the wrapper, whereupon the machine may again be started. The mechanism is so designed as to minimize necessary stoppage of the machine due to improper functioning. Any wrinkled wrappers, however, may be quickly removed, thus minimizing the time required to again place the machine in operation.

While I have shown a particular embodiment of my invention, it will be understood, of course, that I do not wish to be limited thereto since many modifications may be made, and I therefore contemplate by the claims appended hereto to cover any such modifications or substitutions of mechanical equivalents as fall within the true spirit and scope of my invention without sacrificing any of its advantages.

I claim as my invention:

1. Wrapping paper cutting mechanism including an arbor, a movable cutting blade carried thereby, a stationary cutting blade, said movable cutting blade shearingly coacting with said stationary cutting blade during the rotation of said arbor, means for rotating said arbor in a direction for moving said movable cutting blade in the direction of travel of a web of wrapping paper, a floating spring biased feed plate under the web immediately behind said stationary cutting blade and normally assuming a position for lifting the advance edge of the cut web above said stationary cutting blade, and a flexible strip mounted on said arbor, following said movable blade, and bending backwards to engage the top of the web adjacent the cut portion thereof with said feed plate to prevent the cut edge from curling up before, during and after the cut.

2. Wrapper cutting mechanism including an arbor, a movable cutting blade carried thereby, a stationary cutting blade, said movable cutting blade shearingly co-acting with said stationary cutting blade during the rotation of said arbor, means for rotating said arbor in a direction for moving said movable cutting blade in the direction of travel of a web of wrapping paper, a floating feed plate under the web immediately behind said stationary cutting blade and normally assuming a position for lifting the advance edge of the cut web above said stationary cutting blade, said arbor having cam means coacting with said feed plate to depress it each time the arbor rotates, and to release it for pressing the web against the movable cutting blade just prior to the movable cutting blade coacting with the stationary cutting blade to cut a piece from said web, said cam means coacting with said feed plate at a position laterally beyond the edge of the web thereon, and a flexible strip mounted on said arbor, following said movable blade, and bent backwards by said feed plate to engage the top of the web adjacent the cut portion thereof to prevent the cut edge from curling up.

3. Wrapper cutting and feeding mechanism comprising cutting means for cutting a web into individual wrappers, said cutting means including a rotatable arbor, a cutting blade carried thereby, a companion stationary cutting blade mounted on the frame of the mechanism, means for rotating said arbor to cause the blade carried thereby to shearingly coact with the stationary blade, a floating resiliently mounted feed plate behind said stationary blade for supporting the web of material adjacent the point of shearing thereof into individual wrappers, said movable blade effecting depression of said feed plate as the movable blade approaches the stationary blade in shearing coaction therewith, said floating plate lifting the web from which the wrapper has been cut after passage of the movable blade with respect to the stationary blade, and a resilient strip immediately behind said movable blade and of sufficient width to retain the cut edge of the web against said feed plate and prevent it from curling away therefrom before, during and after the cutting operation.

OSCAR SANDBERG.